No. 878,384. PATENTED FEB. 4, 1908.
J. J. HARPEL.
HEATING STOVE.
APPLICATION FILED MAY 10, 1906.
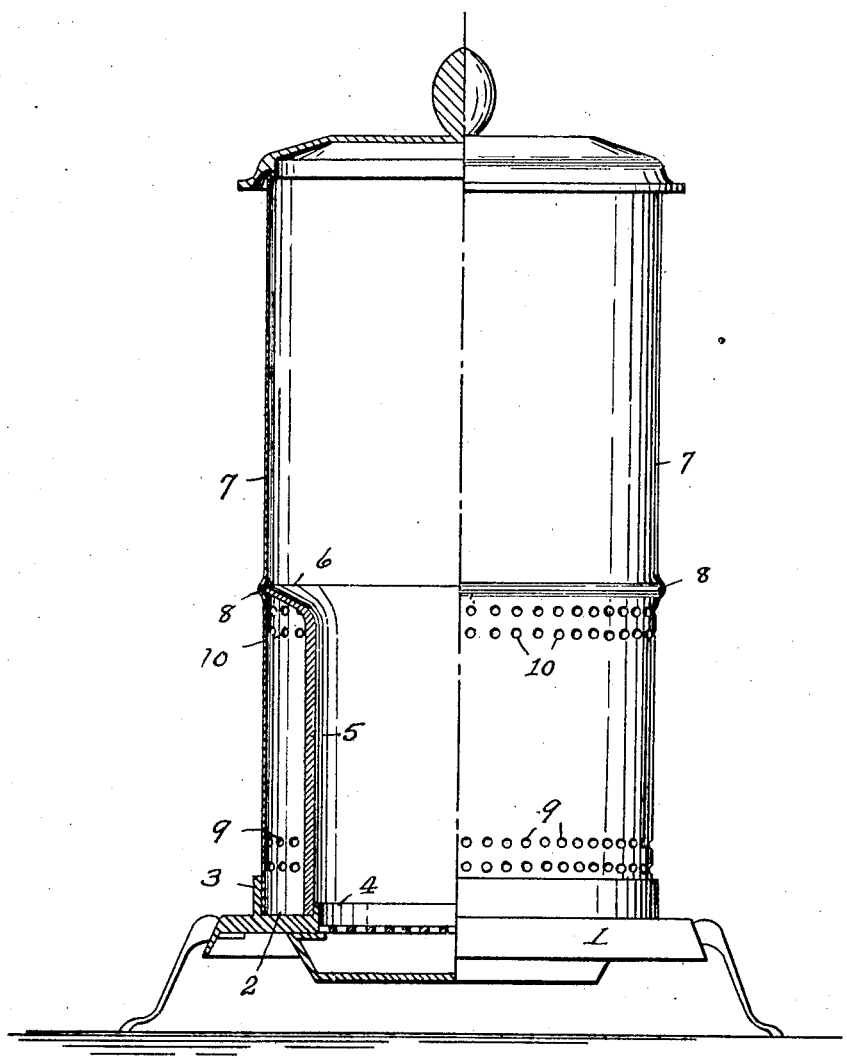
WITNESSES: Jacob J. Harpel, INVENTOR
J. R. Kelly.
Geo. Miller. BY
ATTORNEY.

UNITED STATES PATENT OFFICE.

JACOB J. HARPEL, OF SINKING SPRING, PENNSYLVANIA.

HEATING-STOVE.

No. 878,384.      Specification of Letters Patent.      Patented Feb. 4, 1908.

Application filed May 10, 1906. Serial No. 316,066.

*To all whom it may concern:*

Be it known that I, JACOB J. HARPEL, citizen of the United States, residing at Sinking Spring, in the county of Berks and State of Pennsylvania, have invented new and useful Improvements in Heating-Stoves, of which the following is a specification.

This invention relates to improvements in stoves for heating purposes and the object of my invention is to dispense with the use of the fire brick lining and at the same time to increase the heating capacity of the stove. Heretofore stoves of this class have been made either with a cast iron fire pot, which construction has been objectionable for the reason that its appearance is not pleasing, or they have had a sheet iron casing inclosing a fire pot of fire clay. This latter construction is objectionable in that the fire clay must be replaced frequently, while in neither of the above constructions has the maximum heating capacity been obtained.

In my present device I use a cast iron fire pot in cylindrical form and inclose it in a sheet metal casing, but I provide an air circulating space between them thus preventing the burning or discoloring of the casing while at the same time the fire pot need not be removed and replaced as it is practically permanent.

My invention is more fully described in the following specifications and clearly illustrated in the accompanying drawing, in which the figure shown illustrates a stove in elevation, partly in section, showing my invention.

The numeral 1 designates a base of ordinary construction. This base has the usual circumferential groove 2, but in the present case the outer wall 3 forming said groove is considerably higher than the inner wall 4.

The numeral 5 designates the fire-pot which is approximately cylindrical in form. This cylinder fits into the groove 2 in close proximity to the inner wall 4. The top edge of this cylinder is flanged outwardly and forms a circumferential extension 6.

The numeral 7 designates the sheet metal casing. This casing is adapted to fit in the groove 2 in close proximity to the outer wall 3 to which it may be secured in any suitable manner. This casing is formed with a circumferential groove 8 on its inside adapted to receive the flange 6 of the cylinder. This casing is perforated circumferentially near its base 9 and also at a point 10 just below the circumferential groove 8. By this construction the cold air is drawn into the casing through the perforations 9 and passing up between it and the cylinder it is heated and expelled at the point 10, thus giving a complete circulation of air and obtaining the maximum heating capacity of the stove.

It will be observed that the pot 5 and the bell-mouthed upper end thereof are integral and that the upper edge of the pot is not fixed to the casing 7 but is seated in the circumferential groove 8 thereof. As the pot 5 holds the fuel while burning, the said pot is subjected to the more intense heat and, consequently, will expand and contract to a greater extent than will the casing 7. Consequently, it is desirable that no positive connection, such as rivets or bolts, should be provided between the pot 5 and the casing 7, for if such rivets were used the expansion and contraction of said pot would in the course of time tear them from the thinner metal constituting the casing 7. As the upper edge of the pot is seated in the groove 8, which is not a positive attachment, the said pot may contract and expand without injuring the casing 7. Also, as all of the portions of the pot 5 are integral there is no possibility of the said pot warping to such a degree as to become displaced with relation to its adjacent members.

Having thus fully described my invention, what I claim and desire to secure by Letter Patent is—

A heating stove comprising a base having a circumferential groove with upstanding parallel flanges at the inner and outer edges thereof, the outer flange being of greater vertical dimension, a cylindrical pot mounted thereon and having its weight sustained thereby the lower end of said pot resting in said groove against the inner flange thereof, said pot having at its upper edge a laterally disposed integral annular flange, a sheet metal casing secured in said groove against the outer flange thereof and being spaced from said pot, said casing having an imperforate circumferential groove which receives the laterally-disposed flange of the pot and fits snugly about the same but which is not positively secured thereto, said casing being provided below the upper edge of the pot with an upper and lower series of perforations.

In testimony whereof I affix my signature, in presence of two subscribing witnesses.

JACOB J. HARPEL.

Witnesses:
ED. A. KELLEY,
J. O'R. KELLY.